United States Patent [19]

Hergenrother et al.

[11] 4,219,637
[45] Aug. 26, 1980

[54] POLYPHOSPHAZENE POLYMERS CONTAINING CYCLIC SUBSTITUENTS FROM 1,2- OR 1,3-DIFUNCTIONAL COMPOUNDS

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,112

[22] Filed: Sep. 8, 1978

[51] Int. Cl.$^2$ .................. C08G 83/00; C08G 73/00
[52] U.S. Cl. ........................ 528/399; 528/374
[58] Field of Search ................... 528/399, 374

[56] References Cited

U.S. PATENT DOCUMENTS

| 3,948,820 | 4/1976 | Reynard et al. | 528/168 |
| 4,018,822 | 4/1977 | Sharma et al. | 260/551 P |

OTHER PUBLICATIONS

Bode et al., *Chemische Berichte*, vol. 81, pp. 547–552 (1948).

Primary Examiner—Wilbert J. Briggs, Sr.

[57] ABSTRACT

Polyphosphazene polymers are prepared which contain repeating units represented by the formula:

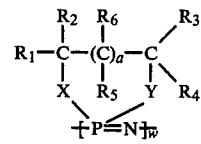

wherein X and Y are the same or different and are selected from the group consisting of: —O—, —S—, or —NH—; $R_{1-6}$ are independently selected from a group consisting of hydrogen, alkyl containing 1 to 10 carbon atoms, cycloaliphatic compounds containing 3 to 10 carbon atoms, and substituted or unsubstituted aryl; a is 0 to 1, and $20 \leq w \leq 50,000$ per polymer.

The polymers of the invention can be utilized to form protective films and can also be utilized in applications such as for molding, coatings, foams and the like.

8 Claims, No Drawings

POLYPHOSPHAZENE POLYMERS CONTAINING CYCLIC SUBSTITUENTS FROM 1,2- OR 1,3-DIFUNCTIONAL COMPOUNDS

BACKGROUND OF THE INVENTION

Polyphosphazene polymers containing repeating

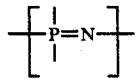

units in which various alkoxy, substituted alkoxy, aryloxy, substituted aryloxy, amino and mercapto groups are attached to the phosphorus atom and their method of preparation "Nitrogen-Phosphorus Compounds", Academic Press, New York, N.Y., 1972 by H. R. Allcock and "Poly(Organophosphazenes)", Chemtech, Sept. 19, 1975, by H. R. Allcock and in such U.S. Pat. Nos. 3,515,799; 3,702,833; 3,856,712; 3,974,242; and 4,042,561.

Polyphosphazene polymers containing cyclic substituents derived from 1,2- or 1,3-difunctional compounds have not been prepared in the prior art known to the applicant. U.S. Pat. No. 3,948,820 to Reynard et al shows the production of copolymers and terpolymers of polyphosphazene polymers containing non-cyclic, pendant hydroxyl containing substituents derived from 1,2-propanediol and 1,3-butanediol in admixture with mono-hydroxy containing compounds such as trifluoroethanol. In the preparation of copolymers and terpolymers, as disclosed in U.S. Pat. No. 3,948,820, a large excess of the total available reactive hydroxy groups is used and cyclic substituents are apparently not formed. The present invention does not form copolymers from 1,2- and 1,3-difunctional compounds and additional monohydroxy compounds, as cyclic substitution would be impossible since monohydroxy compounds preferentially react with the poly(dichlorophosphazene) polymer backbone to prevent the second hydroxy group in the 1,2- or 1,3-difunctional compounds from forming a cyclic oxy linkage.

SUMMARY OF THE INVENTION

This invention relates to polyphosphazene homopolymers and copolymers containing repeating

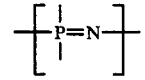

units in the polymer chain in which cyclic substituents are attached to the phosphorus atom. More particularly, the invention relates to polyphosphazene polymers having substituents derived from 1,2- or 1,3-difunctional compounds or substitutionally compatible mixtures of such compounds and to a method of preparing such polymers.

DETAILED DESCRIPTION OF THE INVENTION

The polymers of the invention contain repeating units represented by the formula:

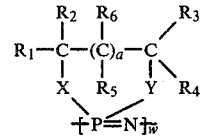

wherein X and Y are the same or different and are selected from the group consisting of: —O—, —S—, or —NH—; $R_{1-6}$ are independently selected from a group consisting of hydrogen, alkyl containing 1 to 10 carbons, cycloaliphatic compounds containing 3 to 10 carbon atoms, and substituted or unsubstituted aryl compounds; a is 0 to 1. The polymer can contain from 20 to 50,000 of such units such that $20 \leq w \leq 50,000$.

It is understood that when only one 1,2- or 1,3-difunctional substituent is used to prepare the polymer of the invention, a homopolymer is formed. Further, it should be understood that while it is preferable that all cyclic substituents be the same, the cyclic substituents can be mixed. The cyclic substituent mixtures may be mixtures of different 1,2- or 1,3-difunctional cyclic radicals. The copolymers contain randomly distributed substituents such that X, Y, $R_{1-6}$ and a are independently selected for each polymer unit.

The term polymer as employed herein includes within its meaning both a homopolymer and a copolymer where polymer units contain more than one substituent.

The polyphosphazene polymers of the invention are substantially free of residual unreacted chlorine or at least contain low levels of residual chlorine on the polymer backbone.

The polyphosphazene polymers containing the cyclic substituents of the present invention display hydrolytic stability and good thermal stability.

The polymers of the present invention can be used to prepare protective films and can be utilized in applications such as molding, foams, coatings, and the like.

METHOD OF PREPARATION

The polyphosphazene polymers of this invention are prepared by reacting a poly(dichlorophosphazene) polymer having the structure —$(NPCl_2)_n$—, in which n is from 20 to 50,000 with a 1,2- or 1,3-difunctional compound in the presence of a tertiary amine, the 1,2- or 1,3-difunctional compounds being used alone, or in a mixture with other 1,2- or 1,3-difunctional compatible compounds which are substitutionally reactive with the phosphorus nucleus.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula —$(NPCl_2)_n$—, in which n may range from 20 to 50,000 or more. As described in the aforementioned references, the polymers are in general prepared by the thermal polymerization of cyclic oligomers having the formula $(NPCl_2)_m$, in which m is an integer from 3 to 7, with the cyclic trimer and tetramer often comprising up to 90% of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures can range from about 130° C. to about 300° C., pressures can range from a vacuum of less than about $10^{-1}$ Torr to superatmospheric and times can range from 30 minutes to about 48 hours.

A preferred process for preparing the poly(dichlorophosphazene) polymers used in the process of this invention is described in the aforementioned incorporated U.S. Pat. No. 4,005,171.

II. 1,2- OR 1,3-DIFUNCTIONAL COMPOUNDS USEFUL IN FORMING THE POLYMERS OF THE PRESENT INVENTION

The compounds which can be used to form the substituents of the polyphosphazene polymers of the present invention are represented by the following formula:

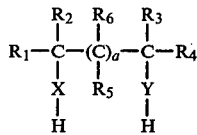

wherein X and Y are the same or different and are selected from the group consisting of: —O—, —S—, or —NH—; $R_{1-6}$ are independently selected from a group consisting of hydrogen, alkyl containing 1 to 10 carbon atoms, cycloaliphatic compounds containing 3 to 10 carbon atoms, and substituted or unsubstituted aryl; a is 0 or 1. Illustrative examples of difunctional compounds which can be employed include: 1,2-dihydroxyethane; 1,2-dihydroxypropane; 1,3-dihydroxypropane; 1,2-dihydroxybutane; 1,3-dihydroxybutane; 2,3-dihydroxybutane; 2,3-dimethyl-2,3-dihydroxybutane; 2,2-diphenyl-1,3-dihydroxypropane; 2,2-diphenyl-1,3-dihydroxybutane; 2,2-dicyclohexyl-1,3-dihydroxypropane; 2,2-dicyclohexyl-1,3-dihydroxybutane; 1,2-diaminoethane; 1,2-diaminopropane; 1,3-diaminobutane; 2,3-diaminobutane; 2,3-dimethyl-2,3-diaminobutane; 2,2-diphenyl-1,3-diaminopropane; 2,2-diphenyl-1,3-diaminopropane; 2,2-diphenyl-1,3-diaminobutane; 2,2-dicyclohexyl-1,3-diaminobutane; 1,2-dimercaptopropane; 1,3-dimercaptopropane; 1,3-dimercaptobutane; 2,2-diphenyl-1,3-mercaptopropane; 2,2-diphenyl-1,3-mercaptobutane; 2,2-dicyclohexyl-1,3-dimercaptobutane; 2,2-dicyclohexyl-1,3-dimercaptopropane; 1,2-dihydroxycyclohexane; and the like.

Difunctional compounds can be employed which contain two different reactive functionalities such as: mercaptoethanol; 1-mercapto-3-propanol; 3-amino-1-butanol; 2-mercapto-3-amino-butane; 2,2-diphenyl-1-hydroxy-3-aminobutane; 2,2-dyclohexyl-1-mercapto-3-hydroxybutane and the like.

As can be seen from the structural formula, the difunctional compounds contain hydroxy, mercapto or amino radicals on either adjacent carbon atoms or on two carbon atoms separated by a carbon atom. Thus; 2,3-; 3,4-; 4,5-; 2,4-; 3,5-; 4,6-; and comparable functionally substituted compounds are shown by the difunctional structural formula representing compounds useful in preparing the polymers of the invention. Therefore, the terms 1,2- and 2,3-difunctional when used in this specification represent the location of the respective functional groups to each other.

Preferred difunctional compounds for preparation of the polymers of the present invention include those compounds containing 1,2-difunctionality where $R_1$, $R_2$ and $R_3$ are hydrogen and $R_4$ is a substitution group. Illustrative examples include 1,2-dihydroxypropane; 1,2-hydroxybutane; 1,2-diaminopropane; 1,2-dimercaptopropane; and the like. Preferred compounds containing 1,3-difunctionality include those compounds in which $R_1$, $R_2$ and $R_3$ are hydrogen and $R_4$, $R_5$ and $R_6$ are substitution groups. Illustrative examples include 2,2-diphenyl-1,3-dihydroxybutane and 2,2-diphenyl-1,3-diaminobutane.

Other preferred compounds include 1,3-butanediol; 2,2-diphenyl-1,3-dihydroxypropane; and 2,3-dihydroxybutane.

IV. THE TERTIARY AMINE

The use of tertiary amine in preparing the polymers of the invention minimizes undesirable side reactions and at the same time acts as an effective acid scavenger.

Tertiary amines which can be employed in preparing the polymers of the invention are those represented by the general structure:

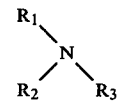

wherein $R_1$, $R_2$, and $R_3$ can each be alkyl containing from 1 to 8 carbon atoms. Thus, for example, the tertiary amine can be a trialkyl amine such as trimethylamine, triethylamine, tri-idopropylamine, tri-n-propylamine, tri-isobutylamine, tri-n-butylamine and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine; N,N,N',N'-tetramethylene diamine; pyridine; N-methyl morpholine; N-methyl pyrrole; 1,4-diaza-bicyclo (2.2.2) octane (DABCO) and dipiperidyl ethane.

As indicated above, the polymers of the present invention are prepared by reacting the poly(dichlorophosphazene) polymer and the 1,2- or 1,3-difunctional compound or compounds in the presence of a tertiary amine.

The specific reaction conditions and proportion of ingredients employed in preparing these polymers can vary somewhat depending on factors such as the reactivity of the specific difunctional compound utilized, the particular tertiary amine employed, and the degree of substitution desired in the finished polymer. The degree of substitution in the present polymer system is substantially 100 percent. In general, reaction temperatures can range from about 25° C. to about 200° C. and times can range from 3 hours up to 7 days; lower temperatures necessitating longer reaction times and higher temperatures allowing shorter reaction times. These conditions are, of course, utilized in order to obtain the most complete reaction possible, i.e., in order to insure the substantially complete conversion of the chlorine atoms in the polymer to the corresponding cyclic ester of the substituent formed from the difunctional compound.

The above reaction is ordinarily carried out in the presence of a solvent. The solvent employed in the reaction should be a solvent for the poly(dichlorophosphazene) polymer, the difunctional compound and the tertiary amine. Examples of suitable solvents which may be employed include diglyme, triglyme, tetraglyme, cyclohexane, chloroform, dioxane, dioxolane, methylene chloride, toluene, xylene, and tetrahydrofuran. The amount of solvent employed is not critical and any amount sufficient to solubilize the reaction mixture materials can be employed. In addition, the materials in the reaction zone should be reasonably free of water. The prevention of water in the reaction system is necessary in order to inhibit the undesirable sidereaction of the available chlorine atoms in the chloropolymer. Preferably the reaction mixture should contain less than 0.01% water.

In general, the amount of the difunctional compounds employed in the process should be about stoichiometrically equivalent to the number of available chlorine atoms in the polymer mixture. However, it is preferred that a slight excess of such compounds be employed in order to insure complete reaction of all the available chlorine atoms. Sufficient excess to cause non-cyclic substitution (about 2 moles of difunctional compound per mole of available chlorine) should be avoided.

While the cyclic substituted poly(phosphazene) polymers of the present invention have been prepared in the above-identified manner, that is, in the presence of a tertiary amine, alternative methods of preparation are available. The prior art methods of poly(dichlorophosphazene) substitution such as by reaction with sodium alkoxide as demonstrated in U.S. Pat. No. 3,370,020 to Allcock et al may be used to substitute the cyclic substituent groups which are derived from the difunctional compounds, where the reactants are not adversely affected by sodium.

The following examples are submitted for the purpose of further illustrating the nature of the present invention and are not intended as a limitation on the scope thereof. Parts and percentages referred to in the examples and throughout the specification are by weight unless otherwise indicated.

EXAMPLE 1

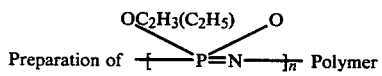

Preparation of $-\!\!\left[\!-\!\!\overset{OC_2H_3(C_2H_5)}{\underset{O}{P}}\!\!=\!\!N\!-\!\right]_{\overline{n}}\!-$ Polymer A 10 oz. bottle was charged with 4.0 cc (44 millimoles) of dry 1,2-dihydroxybutane, 12.3 cc (88 millimoles) of dry triethylamine, 100 cc of dry THF (tetrahydrofuran), and 36.8 gms (40.2 millimoles) of a 12.67 percent tetrahydrofuran solution of poly(dichlorophosphazene). This mixture of material was heated at 80° C. for a period of 89 hours after which the solution was cooled and the amine hydrochloride was separated from solution by centrifugation. The remainder of the solution was coagulated in hexane to yield 4.6 gms of a tan rubbery polymer with a $T_g$ of $-41°$ C. and a $T_m$ of 112° C. A water washing of the salt layer yielded an additional 1.0 gms of tan rubbery polymer. The polymer was found to have the following elemental analysis:

|  | % C | % H | % N | % P | % Cl |
|---|---|---|---|---|---|
| Found | 24.91 | 6.22 | 9.53 | 17.65 | 3.29 |
| Calculated* | 25.06 | 5.02 | 9.45 | 17.77 | 3.57 |

*Based on 13.9% triethylamine hydrochloride, 16.1% hydrolyzed chloropolymer in the homopolymer.

EXAMPLE 2

A 10 oz. bottle was charged with 3.99 cc (44 millimoles) of 2,3-dihydroxybutane, 12.3 (88 millimoles) of dry triethylamine, 100 cc of dry THF, and 40 millimoles of a 12.67 percent THF solution of poly(dichlorophosphazene). This mixture of materials was heated at 80° C. for 20 hours, and, after subsequent coagulation in hexane, yielded 4.3 gms of polymer.

EXAMPLE 3

A 10 oz. bottle was charged with 44 millimoles (5.2 gms) of a 2,3-dimethyl-2,3-dihydroxybutane, 88 millimoles of dry triethylamine, 100 cc of dry THF, and 40 millimoles of a 12.67 percent THF solution of poly(dichlorophosphazene). The mixture was heated at 80° C. for 20 hours and, after subsequent coagulation in hexane, yielded 4.3 gms of polymer.

EXAMPLE 4

A 10 oz. bottle was charged with 44 millimoles (10.04 gms) of 2,2-diphenyl-1,3-dihydroxypropane, 88 millimoles of dry triethylamine, 100 cc of dry THF, and 40 millimoles of a 12.67 percent THF solution of poly(dichlorophosphazene). The mixture was heated at 80° C. for 20 hours. The mixture was subsequently coagulated in hexane to yield 6.0 gms of a hard white plastic material having a $T_g$ of $-93°$ C. and a $T_m$ of 198° C.

EXAMPLE 5

A 10 oz. bottle was charged with 44 millimoles (3.95 cc of 1,3-dihydroxybutane, 88 millimoles of dry triethylamine, 100 cc of dry THF and 40 millimoles of 12.67 percent THF solution of poly(dichlorophosphazene). The material in the bottle was heated at 80° C. for 68 hours. The solution was cooled and the amine hydrochloride was separated from solution by centrifugation. The salt was washed with water and the remaining solution was coagulated in hexane to yield 5.6 gms of a tan powder having a $T_g$ of 19° C. and a $T_m$ of 202° C.

We claim:

1. A polyphosphazene polymer containing units represented by the formula:

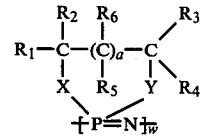

wherein X and Y are the same or different and are selected from the group consisting of: —O—, —S—, or —NH—; $R_{1-6}$ are independently selected from a group consisting of hydrogen, alkyl containing 1 to 10 carbon atoms, cycloaliphatic compounds containing 3 to 10 carbons, and substituted or unsubstituted aryl; a is 0 to 1; $20 \leq (w+z) \leq 50,000$ per polymer; and X, Y, and $R_{1-6}$ are independently selected for each polymer unit.

2. The polymer of claim 1 in which X and Y are —O—, a is zero, $R_1$ is —$C_2H_5$ and $R_{2-4}$ are hydrogen.

3. The polymer of claim 1 wherein the polymer contains a cyclic substituent derived from a compound selected from a group consisting of 1,3-dihydroxybutane; 2,3-dihydroxybutane; 2,3-dimethyl-2,3-dihydroxybutane; 2,2-diphenyl-1,3-dihydroxypropane and 1,2-diaminopropane.

4. The polymer of claim 1 wherein the polyphosphazene polymer contains more than one cyclic substituent and the polymer units are randomly distributed.

5. The polymer of claim 4 wherein the polymer contains a mixture of cyclic substituents derived from compounds selected from the group consisting of 1,2-dihydroxybutane; 2,3-dihydroxybutane; 2,3-dimethyl-2,3-dihydroxybutane; 2,2-diphenyl-1,3-dihydroxypropane and 1,2-dihydroxypropane.

6. A method of preparing polyphosphazene polymers containing units represented by the formulas:

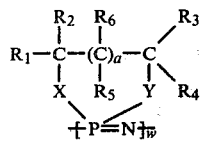

wherein X and Y are the same or different and are selected from the group consisting of: —O—, —S—, or —NH—; $R_{1-6}$ are independently selected from a group consisting of hydrogen, alkyl containing 1 to 10 carbon atoms, cycloaliphatic compounds containing 3 to 10 carbons, and substituted or unsubstituted aryl; a is 0 to 1; $20 \leq w \leq 50,000$ per polymer; and X, Y and $R_{1-6}$ are independently selected for each polymer unit; said method comprising reacting in the presence of a tertiary amine a poly(dichlorophosphazene) polymer having the formula —$(NPCl_2)_n$—, wherein n is from 20 to 50,000, with a compound selected from a group consisting of difunctional compounds containing hydroxy, mercapto or amino functionality or mixtures thereof in the presence of a tertiary amine.

7. A method of claim 6 wherein the difunctional compound is 1,2-dihydroxybutane; 2,3-dihydroxybutane; 2,3-dimethyl-2,3-dihydroxybutane; 2,2-diphenyl-1,3-dihydroxypropane and 1,2-dihydroxypropane.

8. The method of claim 6 wherein the tertiary amine is triethylamine.

* * * * *